United States Patent [19]

Godschalk, Jr. et al.

[11] Patent Number: 4,465,651
[45] Date of Patent: Aug. 14, 1984

[54] APPARATUS AND PROCESS FOR MOLDING A THERMOPLASTIC TUBE HEADPIECE

[75] Inventors: Louis A. Godschalk, Jr., Radnor; Nelson J. Bordelean, West Easton, both of Pa.

[73] Assignee: American Can Company, Greenwich, Conn.

[21] Appl. No.: 479,947

[22] Filed: Mar. 29, 1983

Related U.S. Application Data

[63] Continuation of Ser. No. 279,564, Jul. 1, 1981, abandoned.

[51] Int. Cl.³ .......................................... B29D 23/02
[52] U.S. Cl. .................................... 264/161; 264/163; 264/318; 264/328.9; 425/289; 425/553; 425/577; 425/DIG. 58
[58] Field of Search ...................... 264/161, 318, 328.9, 264/328.12, DIG. 41, 537, 538, 163; 249/59; 425/125, 525, DIG. 58, DIG. 42, 553, 577, 289

[56] References Cited

U.S. PATENT DOCUMENTS

| 2,891,283 | 6/1959 | Cramer et al. | 249/59 |
| 3,020,594 | 2/1962 | Makowski | 425/DIG. 58 |
| 3,031,722 | 5/1962 | Gits | 264/161 |
| 3,207,833 | 9/1965 | D'Errico | 425/125 |
| 3,333,300 | 8/1967 | Cohan | 264/328.9 |
| 3,373,479 | 3/1968 | Watt et al. | 249/59 |
| 3,537,676 | 11/1970 | Miller | 249/59 |
| 3,776,676 | 12/1973 | Kessler | 249/59 |
| 3,988,413 | 10/1976 | Gaudet et al. | 264/DIG. 41 |
| 4,019,711 | 4/1977 | Altenhof et al. | 249/59 |
| 4,101,618 | 7/1978 | Aoki | 264/538 |
| 4,178,003 | 12/1979 | Hobson | 425/DIG. 42 |

FOREIGN PATENT DOCUMENTS

| 664140 | 6/1963 | Canada | 264/318 |
| 1388046 | 12/1964 | France | 425/525 |
| 1526950 | 5/1968 | France | 249/59 |

Primary Examiner—James B. Lowe

[57] ABSTRACT

An apparatus and process for manufacturing a thermoplastic tube headpiece adapted to be fused with a tubular body sleeve and having a fully molded sealing surface and concentric orifice. Male and female members cooperate so as to define a cavity corresponding in shape to the headpiece, maintain the male member in a concentric position within the neck portion of the headpiece cavity and form a passageway. The passageway conveys thermoplastic material received from a sprue in the female member through a sidewall opening and into the cavity. A projection of solidified thermoplastic material corresponding in shape to the sprue and passageway is severed from the sidewalls.

2 Claims, 10 Drawing Figures

APPARATUS AND PROCESS FOR MOLDING A THERMOPLASTIC TUBE HEADPIECE

This application is a continuation application of an earier filed application, by the same inventors, entitled "Apparatus and Process for Manufacturing a Thermoplastic Tube Headpiece Having a Fully Molded Sealing Surface and Concentric Orifice", application Ser. No. 279,564, filed July 1, 1981, now abandoned.

BACKGROUND OF THE INVENTION

1. Field of the Invention

The present invention relates broadly to containers and is more particularly concerned with an apparatus and process for manufacturing a thermoplastic headpiece for a plastic or laminate tube having a fully molded sealing surface and a concentric orifice.

2. Prior Art

The manufacture of thermoplastic headpieces for plastic and laminate tubes is well known in the container art and is typified by U.S. Pat. No. 2,624,071 to Strahm, U.S. Pat. No. 3,260,410 to Brandt et al, and U.S. Pat. No. 3,207,833 to D'Errico.

Injection molding is conventionally used in the manufacturing process. This technique typically involves expulsion of molten thermoplastic material from an injection cylinder into a mold unit which has a cavity that includes a portion corresponding to the shape of the headpiece to be molded. The uppermost surface of the cavity, referred to as the sealing surface of the cavity, has an opening to permit conveyance of the thermoplastic material therethrough into the mold cavity. The mold unit also includes a housing or cover for covering the top of the cavity and a passageway extending through the cover which communicates with the opening in the sealing surface.

In order to form the headpiece, the injection unit engages the mold unit so as to permit conveyance of the thermoplastic material from the outlet of the injection cylinder, through the passageway in the cover and subsequently through the opening in the sealing surface into the mold cavity. The thermoplastic material is steadily injected until it fills the mold cavity. After solidification of the molten material, the headpiece is removed so as to permit finishing.

Traditionally, the injection and solidification processes produce extraneous thermoplastic material, referred to as flash, extending from the sealing surface of the headpiece that requires removal during finishing. This flash results from the material that solidifies within the passageway and remains attached to the sealing surface upon removal of the cover.

The solidified headpiece is subsequently positioned for finishing so that an automatic snipping or trimming device cuts the flash just above the sealing surface of the headpiece leaving thermoplastic projections extending from the sealing surface that often reach 0.030 inches in length due to manufacturing tolerances. Consequently, an undercut or snip well is required in the hollow of the cap so as to provide clearance between the underside of the cap and the projections. This undercut is standard in commercially available plastic caps for plastic tubes, however, in the pharmaceutical market and in other areas where metal caps and tubes are conventionally used, undercuts or snip wells are not built into the cap. Typically, the smooth finish provided on the sealing surface of the metal tube by a lathe type of tool eliminates the need for an undercut in the cap. A change from plastic caps to metal caps for flexible tubes would normally require a change in the metal cap mold to accommodate the thermoplastic projection that is both expensive and time consuming.

In addition, the traditional tooling presently used in the manufacturing process utilizes a mold unit which includes a male member positioned within a female member so as to produce the headpiece cavity and orifice. The male member, typically sways during the injection cycle and as a result the orifice is not concentrically positioned within the headpiece neck. Some commericially available metal caps are provided with an inner dome, in such cases a concentric orifice and smoothly finished sealing surface is necessary for this cap to properly seal on the headpiece.

There is a commercial need for a tube headpiece of plastic or laminate with a sealing surface capable of sealing flush against the underside of commercially available metal caps while being capable of providing a concentric orifice. In addition, it is desirable to have a headpiece that provides cost savings in the manufacture of a tube by eliminating the need for a snipping or trimming operation while providing a smoothly finished, fully molded sealing surface on a headpiece with a concentric orifice. Satisfying these needs would permit competitive pricing between plastic or laminate tubes having headpieces with smooth sealing surfaces and the metal tubes presently used in these markets.

It is therefore an object of the present invention to provide an apparatus and process for manufacturing a plastic headpiece that does not require an undercut or snip well in the hollow of the cap, and which, therefore, can seal flush against the underside of commercially produced metal caps.

It is an additional object to provide a molding apparatus and process for manufacturing a headpiece having a concentric orifice and smoothly finished, fully molded sealing surface without the need for shipping the extraneous material from the sealing surface of the headpiece in order to produce a finished product.

Other objects and advantages of the invention will be apparent as it is better understood from the following description, which taken in connection with the accompanying drawings, discloses a preferred embodiment thereof.

BRIEF DESCRIPTION OF THE DRAWINGS

In the drawings wherein like numerals are employed to designate like parts throughout.

SUMMARY OF THE INVENTION

Figure 1:
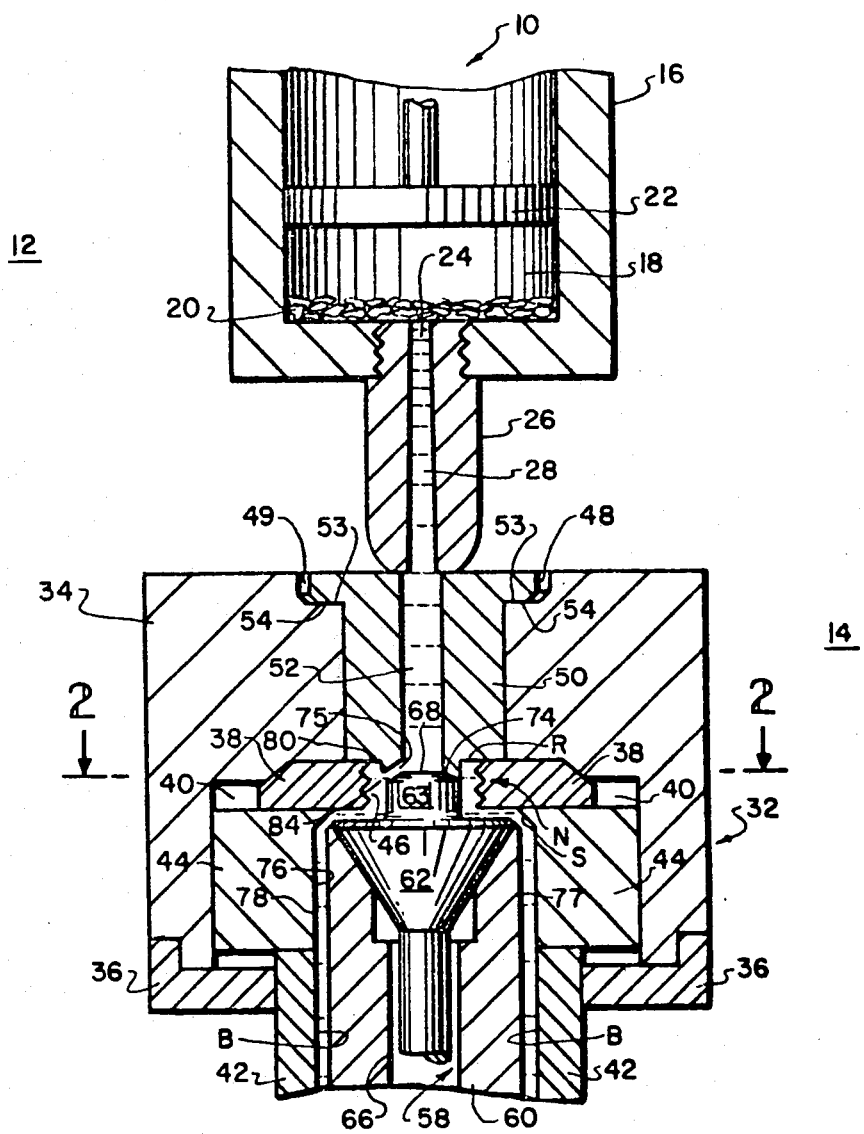
FIG. 1 is a longitudinal sectional view through an injection molding apparatus of the present invention using internal gates in the manufacture of a headpiece for a tube and corresponding to a view of the apparatus taken along line 1—1 of FIG. 2.
Figure 2:
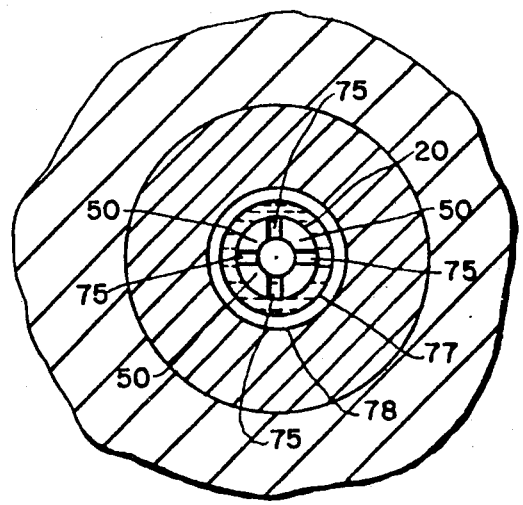
FIG. 2 is a cross-sectional view taken along line 2—2 of FIG. 1.

This invention comprises an apparatus and the operative steps for manufacturing a headpiece for the body of a plastic or laminate tube. A conventional injection unit is used in combination with a mold unit designed to manufacture a plastic or laminate tube by molding and bonding a headpiece onto a tube sleeve using an internally recessed or external gate system. An apparatus for forming a thermoplastic headpiece adapted to be fused with a tubular body is equipped with the following: a male member; and a female member for receiving the male member so as to define therewith a cavity which is configured at least in part to the shape of a headpiece. The headpiece has an inner and outer sidewall joined by a sealing surface with at least one of the sidewalls having at least, one opening. The female member has a sprue with an inlet for receipt of thermoplastic material. The male and female members cooperate so as to define at least one passageway communicating at one end with the opening for conveying thermoplastic material received from the sprue through the opening into the cavity whereby the headpiece has a fully molded sealing surface. The cavity is filled through either the inner or outer sidewall with molten thermoplastic material that is subsequently allowed to solidify. After solidification, the headpiece is removed from the cavity having a fully molded, smoothly finished top or sealing surface on the neck portion, since any extraneous solidified thermoplastic material, commonly referred to as flash, occurs on the sidewall. The flash that remains attached to the sidewall after having solidified in the sprue and passageway is removed at a degating station. A tubular body or sleeve may be positioned in the lower cylindrical portion of the mold cavity for fusing with the thermoplastic material of the headpiece during injection. The tube is subsequently capped and packed for shipping.

DETAILED DESCRIPTION OF THE DRAWINGS

Referring now to FIGS. 1-6 illustrating the internally recessed gate system of the present invention wherein an injection molding apparatus generally designated by the numeral 10 comprises a conventional injection unit 12 and a mold unit 14. The apparatus may in accordance with this invention comprise a pluraliity of injection units intended for simultaneously filling different mold units which are arranged, for example, on a single indexing device. It is also possible for the injection unit to be capable of filling a plurality of mold units simultaneously in the course of a single injection. The injection unity 12 has an injection cylinder 16 defining a chamber 18 in which thermoplastic stock 20 is disposed typically as pellets and melted by a heating device (not shown).

A reciprocating piston 22 located within the chamber 18 is capable of compressing and, consequently, expelling the stock 20 through an outlet or discharge orifice 24. The injection unit 12 includes an injection head 26 which may be unitary with the injection unit 12 or mounted thereon. Extending axially and centrally through the injection head 26 is a channel 28 with its inlet at the discharge orifice 24 so as to communicate therethrough with the chamber 18. The injection unit 12 may be fitted with a device (not shown) for moving the injection unit 12 toward the mold unit 14 for engagement therewith and axially away from the mold for disengagement therefrom. Alternatively, or additionally, a moving device may be associated with mold unit 14 for movement towards and away from the injection unit 12.

The mold unit 14 is comprised of a female member 32 and a male member 58. The female member 32, also referred to as a die, includes a die housing 34, an annular collar 36 and a set of segmented neck plates 38, 40 which, when cammed into a closed position by lower sleeve 42 acting against collar 44, shape the outer peripheral surfaces and screw threads 46 of the molded neck element N. The die housing 34 has a central opening 48 at its upper end overlying the neck plates 38, 40 fitted with an insert 50 which has a sprue 52 communicating with chamber 18 through the channel 28. The upper end of the insert 50 is suitably flanged at 53 to rest on the upper wall 54 of the die housing 34 and may be recessed (not shown) so as to receive the tip end of the injection head 26. The male member or mandrel 58, which acts as the inner core of the mold unit 14, includes a shoulder-forming member or poincon 60 over which the body sleeve B is placed and an internal neck forming member or soupape 62. Further details of the mandrel 58 with respect to its mounting, the loading of body sleeve B and bringing the mandrel 58 into molding position within die 32 are dealt with in U.S. Pat. No. 3,207,833, commonly assigned herewith and incorporated herein by reference. The soupage 62 is centrally disposed in the upper end of shoulder-forming member 60 is slidably fitted within a central bore 66 running through male member 58.

The inner surface of the female die 32 conforms substantially to the outer surface of the male member 58 so as to define a mold cavity 76 therewith and therebetween corresponding to the shape of a tube. Thus, the cavity 76 includes an upper portion corresponding to the shape of a headpiece and a lower cylindrical portion wherein the preformed sleeve or tubular body B is positioned.

Figure 6:
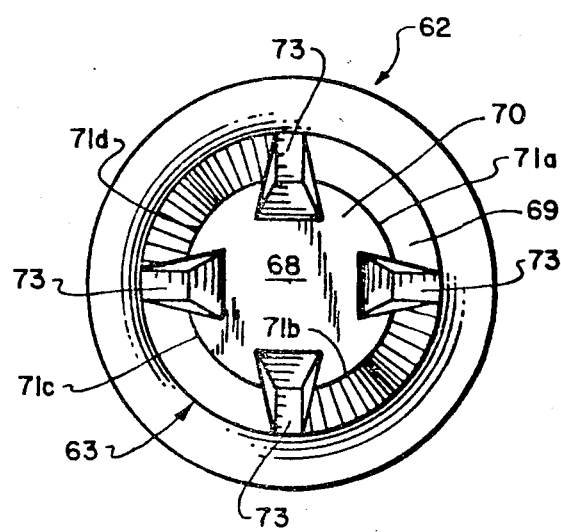
FIG. 6 is a plan view of the soupape of FIG. 5.

The upper portion 63 of the soupape 62 is specially configured to form the molded neck element N, in conjunction with neck plate 38, and the insert 50. As shown most clearly in FIGS. 5 and 6 the top surface 68 of the soupape 62 has a flat portion 70 that aligns at least in part with the sprue 52, shown in phantom of insert 50. A bevel 69 extends outwardly from the rim 71 of the top surface 68 and circumferentially around the soupape 62. Extending radially from and recessed within the top surface 68 and bevel 69 are sloping surfaces 72a, b, c, d which cooperate so as to form the chutes or troughs 73 that slope preferably at a downward angle from the top surface 68 of approximately 45°. These troughs 73 are shown in FIG. 6 as occurring at four locations in the soupape 62. The bevel 69, also referred to as a stop surface, seals or mates with the bottom surface of insert 50, shown in phantom in FIG. 5, so as to maintain the soupape 62 in a fixed location concentrically positioned within the neck N of the headpiece. This type of seal is referred to as a kiss-off. Thus the bevel or stop surface 69 guides and aligns the insert 50 and soupape 62 so as to provide for a concentric orifice within the neck element N. The surfaces of the soupape and the die insert 50 can vary but must mate so as to result in concentricity and shut-off, and accessibility to the mold cavity 76 by the thermoplastic material 20. The insert 50 provides a cover to each of the chutes 73 thereby forming four corresponding passageways 75. The passageways 75, also referred to as runners or gates, extend from the insert sprue 52 to the inner sidewall 77 of the neck portion N. At least one passageway 75 and at least one sidewall opening 84 is necessary for injecting thermoplastic stock 20 into the mold cavity 76. The combination of sprue and passageways is referred to herein as a conduit system.

Thus, the neck portion N of the mold cavity 76 is comprised of the following: an outer sidewall 78 defined by the neck plate 38; a top wall with a sealing surface 80 defined by the bottom surface of the insert 50; and an inner sidewall 77 defined jointly by the upper portion 63 of the soupape 62 and insert 50. The inner sidewall 77 has at least one opening 84 communicating with a passageway 75.

Figure 3:
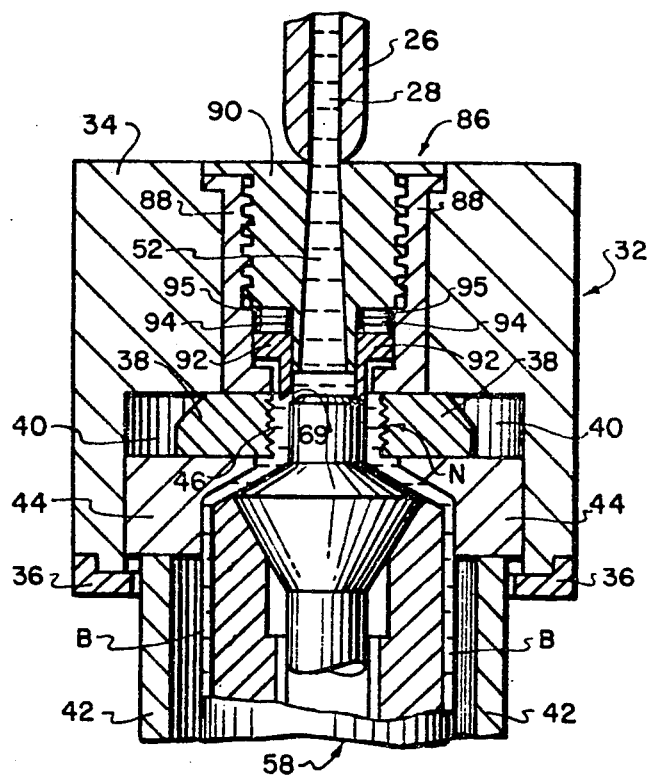
FIG. 3 is a longitudinal sectional view through an injection molding apparatus of the present invention using internal gates and a floating die insert.
Figure 4:
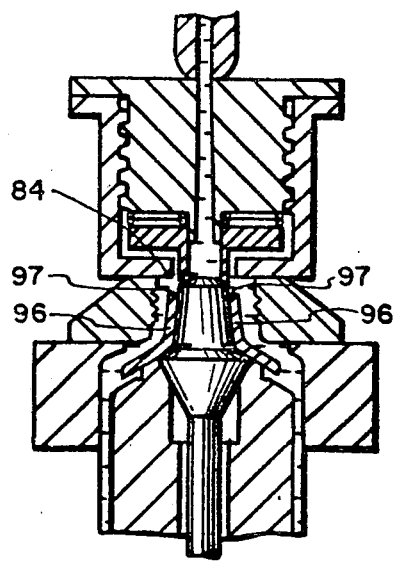
FIG. 4 is a partial longitudinal sectional view through an injection molding apparatus of the present invention using internal gates, a floating die insert and a neck insert.
Figure 5:
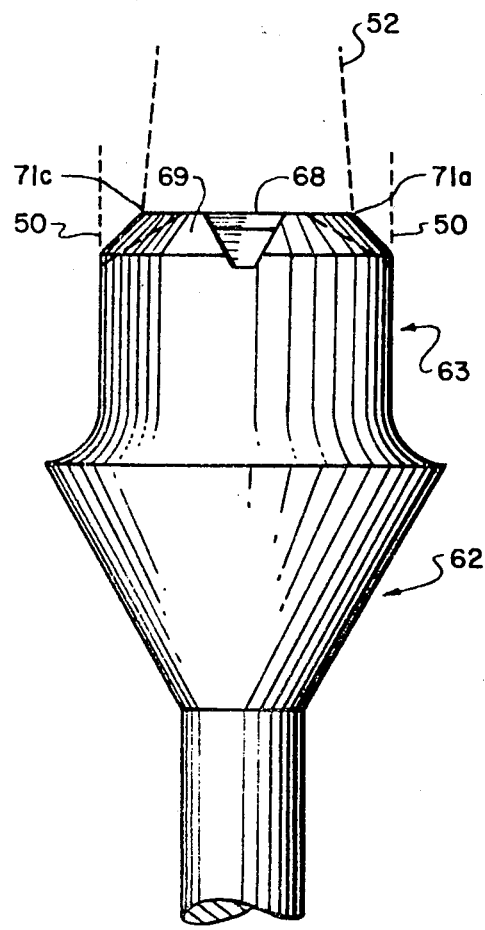
FIG. 5 is an elevational view of an internal neck forming member or soupape used with the internal gate manufacturing apparatus of FIGS. 1-4.

In order to properly effect the injection of the thermoplastic material 20, the injection unit 12 and mold unit 14 are brought into coaxial alignment and engagement as shown in FIGS. 1, 3 and 4. Upon extension of the piston 22 the thermoplastic material 20 is expulsed into a channel 28 and thence through a conduit system composed sequentially of sprue 52 and passageways or gates 75 whereupon the material enters the mold cavity 76 through sidewall opening 84 located below the sealing surface 80. The thermoplastic material 20 introduced into the cavity 76 fuses with the preformed plastic or laminate tubular body B in accordance with methods well known in the art.

FIG. 3 illustrates an alternative embodiment of the internal recessed gate system with a floating die insert assembly generally designated by 86 comprised of an outer die insert 88 circumferentially surrounding an insert cap 90 positioned above inner die insert 92. The inner insert 92 moves up or down within the outer insert 88 with the amount of vertical motion controlled by the insert cap 90 and the two spring loaded washers 94 located within the recess 95 when the inner insert plate 92 seats against the bevel 69 of the soupape 62. Upon suitable positioning of the mandrel 58 relative to the female member 32, the bottom of the inner insert 92 contacts the bevel 69 of the soupape 62 causing spring washers 94 to compress. The compressed springs 94 produce a reactive force on the inner insert 92 that produces shutoff by sealing the inner insert 92 against the bevel 69 which in turn provides for concentricity of the soupape 62 within the neck element N. Also, by use of the floating die insert 86 set up and matched tool problems are lessened as tolerances are increased.

FIG. 4 shows the applicability of the apparatus using internal recessed gates to molding a headpiece having a neck insert 96. The neck insert 96 is preloaded on the soupape 62 prior to the positioning of the male member 58 within the female member. The top surface 97 of the neck insert 96 is positioned below the opening 84 in the inner sidewall 77 so as to permit access through the opening 84 into the mold cavity 76 by the thermoplastic material 20 that is conveyed through passageway or gate 75.

Figure 7:
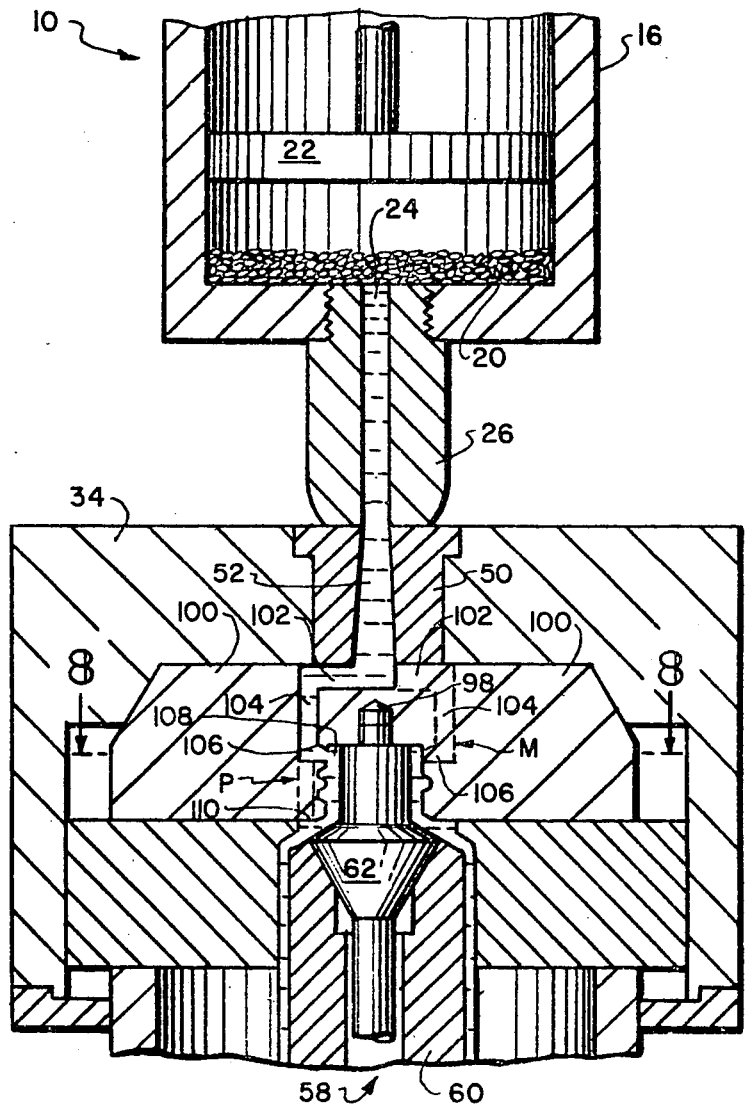
FIG. 7 is a longitudinal sectional view through an injection molding apparatus of the present invention using external gates with an alternative embodiment shown in phantom and corresponding to a view of the apparatus taken along line 7—7 of FIG. 8.
Figure 8:
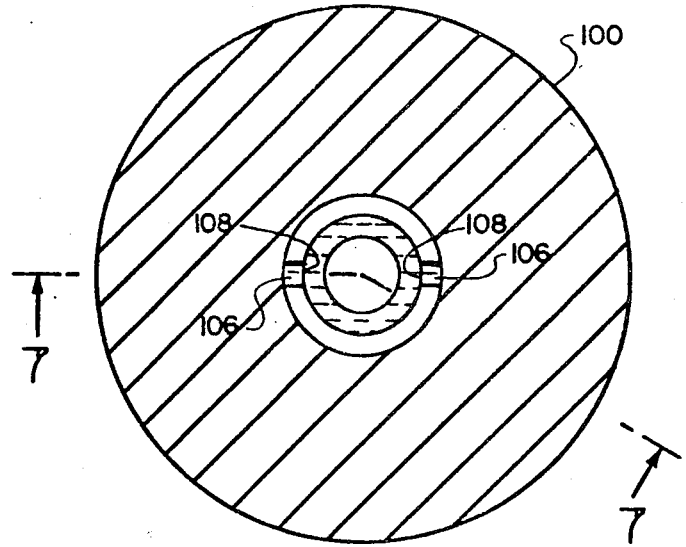
FIG. 8 is a cross-sectional view taken along line 8—8 of FIG. 7.

FIGS. 7 and 8 illustrate the external gating system of the present invention. Projecting from the soupape 62 is a centrally positioned register pin 98 that mates with a corresponding recess in thread plate 100 to properly coordinate the upper portion 63 of the soupape 62 with the thread plate 100 so as to be concentrically positioned within the neck portion N. Upon subsequent removal of the solidified headpiece from the male member 58 a concentric orifice is defined within the headpiece neck N which corresponds to the space previously occupied by the upper portion 63 of the soupape 62. Extending outward from the sprue 52 within the thread plate 100 is a runner or gate system comprised of two symmetric sets of passageway, one of which is shown in phantom at P. Each set of passageways comprises an outward passageway 102 communicating at one end with the sprue 52 and at the other end with an axial passageway 104. Each axial passageway 104 in turn communicates with a laterally inward passageway 106, each of which outlets into outer sidewall 78. Because the runner or gate system is external to the tube the process is referred to as injection molding through an external gate system. Alternatively, or additionally, as also shown in phantom at P., axial passageway 104 can extend the to shoulder portion of the cavity 76 so as to enable the cavity 76 to be filled with thermoplastic material 20 through the opening 110 in the outer sidewall 78 of the shoulders. Preferably, the gates 106 outlets through the outer sidewall in the neck N or shoulder portions through an opening which is located above or below the threads.

Thus, a conduit system composed sequentially of sprue 52, and the passageway(s) which comprise the runner system is responsible for conveying the thermoplastic material 20 to the outer sidewall 78 of the neck N portion whereupon it enters the mold cavity 76 through an opening 108. Alternatively or additionally, a conduit system composed sequentially of sprue 52, and runner system is responsible for conveying the thermoplastic material to the shoulder portion S whereupon it enters the outer sidewall through an opening.

After the cavity 76 is filled during the injection cycle through either the internal recessed or external gate system the mold unit drops away from the injection unit and indexes through a cure cycle on, for example, a rotary table. At the end of the cure cycle the mold unit indexes to the pre-stripping station where the female member is lifted off the headed tube remains mounted on the male member (not shown). It is contemplated that a thermoplastic projection corresponding in shape to the conduit system used in the apparatus remains attached to the sidewall. In particular, the thermoplastic projection of the internal gate system, shown in FIG. 9, in the severed state at 116, remains attached to the inner sidewall while the external gate system, shown in FIG. 10 in the severed state at 117, remains attached to the outer sidewall. In order to obtain these projections intact and attached to the sidewall the external gate system requires opening of the thread plate 100 along a parting surface or seam passing through the conduit system.

For the internal gate system openable plates can also be utilized. Alternatively, removal and lift off of the female member is accomplished in a different manner by the apparatus shown in FIGS. 1-6. The die insert is provided with a sprue having a constant diameter or a taper from its outlet to its inlet so that the die insert can be lifted off the cured thermoplastic material within the sprue in conjunction with the lifting of the remaining parts of the female member. Furthermore, each passageway or gate has its chute in the soupape and cover in the insert so that lifting the female member off the male member causes the two members to separate along a seam defined by the junction of the upper surface of the soupape and lower surface of the insert while permitting the projection to remain attached to the inner sidewall at the opening.

The table then indexes into the stripping station, where compressed air forces the male member upward and a clamp grips the sprue portion of the projection so as to strip the headed tube from the male member. The headed tube is transported by the clamps onto the degating and capper core.

Figure 9:
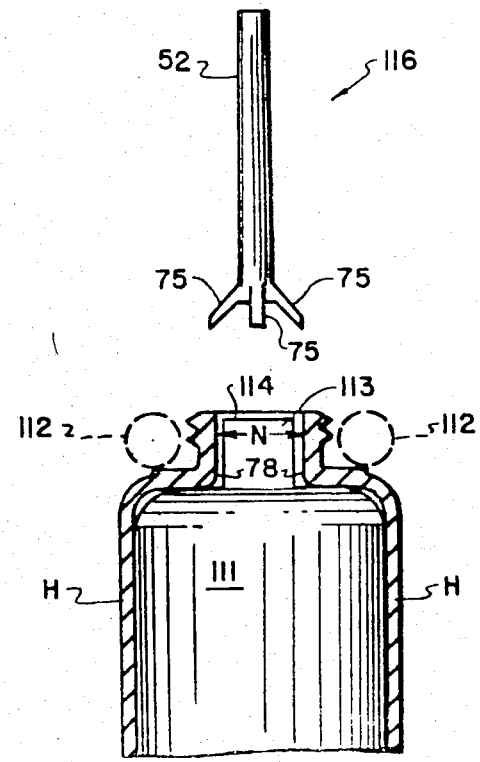
FIG. 9 is an elevational view showing the degating of internal gates.

FIG. 9 illustrates the method for degating of the internal recessed gate system of FIGS. 1–6. The headed tube H transported by the degating and capper core 111 enters the degating station. A round positioning tool 112, referred to as a doughnut, then seats the headed tube on the degate and capper core III by forcing the degate pin 113 into the headed tube neck N thereby shearing the projection at the extremity of the gate portion 75 from the inner sidewall 77 and forcing the thermoplastic projection 115 from the headed tube. The height of the degating pin 113 is critical as the upper surface 114 must produce the shearing while its final position within the headed tube H must not interfere with the capping operation which occurs at the final station before packing.

Figure 10:
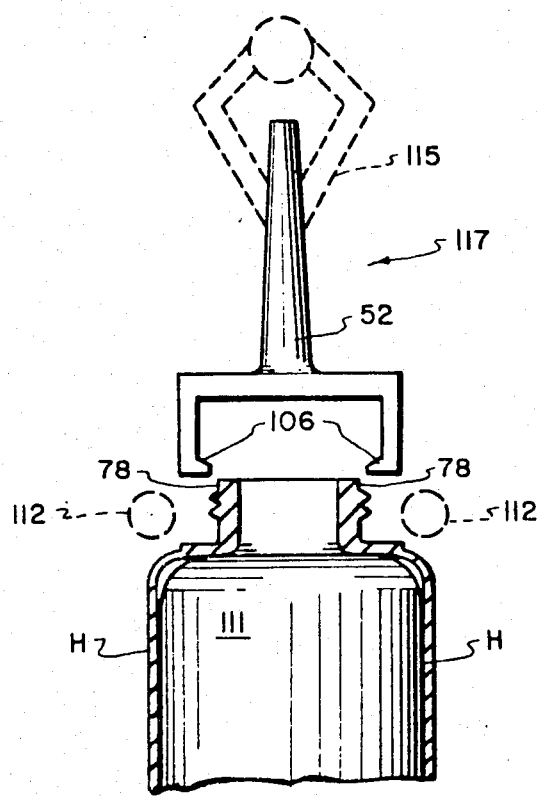
FIG. 10 is an elevational view showing the degating of external gates.

FIG. 10 illustrates the method used to degate the external gate system of FIGS. 6 and 7. The headed tube H transported by the degate and capper core 111 enters the degating station and the positioning tool 112, referred to as a doughnut, seats and holds the headed tube on the degate and capper core 111. The stripper 115, shown in phantom, clamps onto the sprue portion of the projection 117 headed tube H and rotates until the projection is severed from the outer sidewall 78 at the outlet of the passageway 106.

It has been found that the employment of the apparatus shown, results in a substantial increase in the speed and efficiency of an automatic injection molding apparatus used in the molding of collapsible tubes.

A principal advantage of the arrangement represented is that the injection openings occur on the sidewall of the neck portion of the headpiece so that the upper or sealing surface of the headpiece is fully molded and smoothly finished and the headpiece has a concentric orifice.

We claim:

1. A process for the injection molding of a thermoplastic headpiece adapted to be fused with a preformed tubular body, the headpiece having a neck portion and a shoulder portion, said neck portion having an imaginary central axis and comprising an inner sidewall and an outer sidewall having screw threads thereon, the said sidewalls being joined by a top wall with a sealing surface, the neck portion forming an orifice which is concentric with respect to said axis;

the process comprising the steps of:

forming a cavity in the shape of said headpiece in a mold unit, said cavity being formed in said mold unit by the mating of a male die member and a female die member, said mold unit having a sprue aligned along said axis and at least partially positioned within said neck portion and at least partially positioned above said top wall to conduct liquid-state thermoplastic material to said cavity;

bringing said male die member to a predetermined position in proximity to said female die member to form said cavity and also, simultaneously, form between them a passageway communicating at one end with said sprue and at the other end with the said inner sidewall of said neck portion; said passageway being within said neck portion;

injecting liquid-state thermoplastic material into said cavity through said sprue and passageway to form said headpiece with a flash-free top wall sealing surface adapted for sealing with a cap;

solidifying the thermoplastic material; and inserting a severing means within said neck portion; severing the solid thermoplastic material at the passageway and removing the severed passageway and its connected sprue from the headpiece.

2. Apparatus for the injection molding of a thermoplastic headpiece adapted to be fused with a preformed tubular body, the headpiece having a neck portion and a shoulder portion, said neck portion having an imaginary central axis and comprising an inner sidewall and an outer sidewall having screw threads thereon, the said sidewalls being joined by a top wall with a sealing surface, the neck portion forming an orifice which is concentric with respect to said axis;

the apparatus comprising in combination:

a male die member;

a female die member including mold parts for receiving said male die member and defining therewith a cavity having a configuration corresponding to the shape of the headpiece and a sprue which is aligned along said axis and at least partially positioned within said neck portion and at least partially positioned above said top wall with an inlet for receipt of liquid-state thermoplastic material;

at least one passageway located within said neck portion and formed by the bringing together of said male member and said female member and being between them, said passageway being within said neck portion and communicating at one end with said sprue and at the other end with said inner sidewall of said neck portion, said passageway conveying liquid-state thermoplastic material received from said sprue into said cavity;

wherein said headpiece is formed with a flash-free molded top wall adapted to be a sealing surface with a cap; and severing means inserted within said neck portion to sever the solid-state thermoplastic material of said passageway proximate the junction of said passageway with said inner sidewall.

* * * * *